(12) United States Patent
Edwards et al.

(10) Patent No.: US 9,317,687 B2
(45) Date of Patent: Apr. 19, 2016

(54) IDENTIFYING ROOTKITS BASED ON ACCESS PERMISSIONS

(75) Inventors: Jonathan L. Edwards, Portland, OR (US); Aditya Kapoor, Beaverton, OR (US); Michael S. Hughes, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 129 days.

(21) Appl. No.: 13/476,898

(22) Filed: May 21, 2012

(65) Prior Publication Data
US 2013/0312095 A1 Nov. 21, 2013

(51) Int. Cl.
*G06F 21/00* (2013.01)
*G06F 21/56* (2013.01)

(52) U.S. Cl.
CPC .................... *G06F 21/566* (2013.01)

(58) Field of Classification Search
None
See application file for complete search history.

(56) References Cited

U.S. PATENT DOCUMENTS

| 7,660,797 | B2* | 2/2010 | Marinescu et al. | 726/22 |
|---|---|---|---|---|
| 7,698,742 | B1* | 4/2010 | Ferrie | 726/24 |
| 7,845,009 | B2* | 11/2010 | Grobman | 726/24 |
| 8,011,010 | B2* | 8/2011 | Michael et al. | 726/24 |
| 8,239,947 | B1* | 8/2012 | Glick et al. | 726/24 |
| 8,452,744 | B2* | 5/2013 | Nichols et al. | 707/705 |
| 8,479,292 | B1* | 7/2013 | Linhardt | 726/23 |
| 8,495,741 | B1* | 7/2013 | Naftel et al. | 726/24 |
| 2008/0005797 | A1* | 1/2008 | Field et al. | 726/24 |
| 2008/0120499 | A1* | 5/2008 | Zimmer et al. | 713/2 |
| 2008/0301426 | A1* | 12/2008 | Arges et al. | 713/2 |
| 2009/0288167 | A1* | 11/2009 | Freericks et al. | 726/23 |
| 2012/0198514 | A1* | 8/2012 | McCune et al. | 726/1 |
| 2013/0254521 | A1* | 9/2013 | Bealkowski et al. | 713/2 |

OTHER PUBLICATIONS

Sha et al., "R/Bootkit detection Based on Trusted Computing and Neural Network", 978-1-4244-5265-1/10, IEEE 2010.*

* cited by examiner

*Primary Examiner* — Peter Poltorak
(74) *Attorney, Agent, or Firm* — Baker Botts L.L.P.

(57) ABSTRACT

A method for monitoring for malware includes, during a boot process on an electronic device, determining a portion of memory, determining that the portion of memory is reserved for exclusive access by an entity on the electronic device, and, based on the determination that a portion of memory is reserved for exclusive access during the boot process, determining that the reservation is indicative of malware.

17 Claims, 2 Drawing Sheets

IDENTIFYING ROOTKITS BASED ON ACCESS PERMISSIONS

TECHNICAL FIELD OF THE INVENTION

The present invention relates generally to computer security and malware protection and, more particularly, to identifying rootkits based on access permissions.

BACKGROUND

Malware infections on computers and other electronic devices are very intrusive and hard to detect and repair. Antimalware solutions may require matching a signature of malicious code or files against evaluated software to determine that the software is harmful to a computing system. Malware may disguise itself through the use of polymorphic executables wherein malware changes itself to avoid detection by anti-malware solutions. In such case, anti-malware solutions may fail to detect new or morphed malware in a zero-day attack. Malware may include, but is not limited to, spyware, rootkits, password stealers, sources of spam, sources of phishing attacks, sources of denial-of-service-attacks, viruses, loggers, Trojans, adware, or any other digital content that produces unwanted activity.

SUMMARY

In one embodiment, a method for monitoring for malware includes, during a boot process on an electronic device, determining a portion of memory, determining that the portion of memory is reserved for exclusive access by an entity on the electronic device, and, based on the determination that a portion of memory is reserved for exclusive access during the boot process, determining that the reservation is indicative of malware.

In another embodiment, a system for monitoring for malware includes an electronic device including a portion of memory, a processor coupled to a computer readable medium, and computer-executable instructions carried on the computer readable medium. The instructions are readable by the processor. The instructions, when read and executed, cause the processor to, during a boot process on the electronic device, determine the portion of memory, determine that the portion of memory is reserved for exclusive access by an entity on the electronic device, and, based on the determination that a portion of memory is reserved for exclusive access during the boot process, determine that the reservation is indicative of malware.

In yet another embodiment, an article of manufacture includes a computer readable medium and computer-executable instructions carried on the computer readable medium, the instructions readable by a processor. The instructions are readable by the processor. The instructions, when read and executed, cause the processor to, during a boot process on the electronic device, determine the portion of memory, determine that the portion of memory is reserved for exclusive access by an entity on the electronic device, and, based on the determination that a portion of memory is reserved for exclusive access during the boot process, determine that the reservation is indicative of malware.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
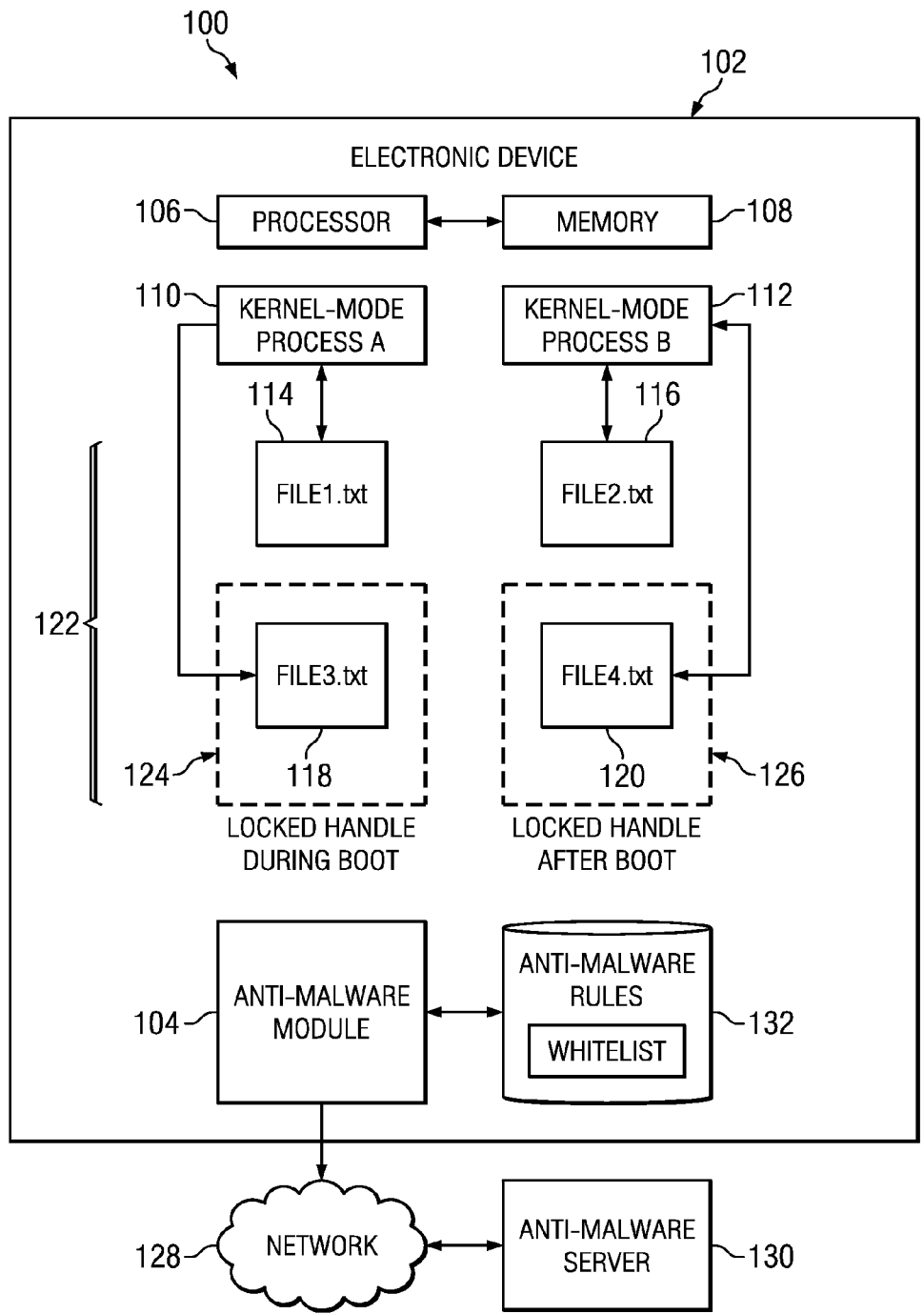
FIG. 1 is an illustration of an example system for identifying malware, including rootkits, based upon access permissions.

FIG. 1 is an illustration of an example system 100 for identifying malware, including rootkits, based upon access permissions. In one embodiment, system 100 may be used to identify malware based upon access permissions as such permissions exist during boot of a system, device, or operating system of a monitored device. System 100 may include and be configured to execute anti-malware module 104 to evaluate the permission, lock, or ownership status of files and processes on electronic device 102 and, based on such evaluation, determine whether malware is present or may be present on electronic device 102. If any files, such as files 122, are write-protected, assigned or allocated to specific processes, or otherwise locked during boot, anti-malware module 104 may be configured to determine that such activity is suspicious as possibly indicative of malware. Anti-malware module 104 may determine one or more processes, application, files, or other entities creating such write-protection, assigning, allocating, or locking, such as kernel-mode process A 110 and kernel-mode process B 112. Further, anti-malware module 104 may be configured to determine the malware status of such entities by, for example, using hashes, behavioral rules, signatures, or other mechanisms from anti-malware rules 132 or anti-malware server 130. If such entities causing locking are known to be malware, anti-malware module 104 may determine that the entity is malicious and take corrective action. If such entities are known to be safe, anti-malware 104 may determine that such locking is not indicative off malware. If such entities are unknown, anti-malware 104 may take corrective action, such as assuming that the entity is malicious or reporting the observation to an anti-malware server 130.

Anti-malware module 104 may be configured to execute on any suitable portion of system 100, such as any electronic device, computer, server, or other suitable mechanism to scan or monitor for malware. In one embodiment, anti-malware module 104 may be resident and executing on the electronic device, such as electronic device 102, that anti-malware module 104 is configured to scan or monitor for malware. In another embodiment, anti-malware module 104 may be resident on another electronic device and configured to scan or monitor electronic device 102. In such an embodiment, anti-malware module 104 may be executing, for example, as a software-as-a-service, cloud computing application, or other remote application over a network.

Anti-malware module 104 may be implemented by, for example, any application, process, script, module, executable, server, executable object, library, or other suitable digital entity, as well as any suitable combination of digital and analog circuitry. Anti-malware module 104 may include logic or instructions for execution by a processor such as processor 106. The logic of instructions of module 102 may be resident within a memory 108 communicatively coupled to processor 106.

Processor 106 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 106 may interpret and/or execute program instructions and/or process data stored in memory 108. Memory 108 may be configured in part or whole as application memory, system memory, or both. Memory 108 may include any system, device, or apparatus configured to hold and/or house one or more memory modules. Each memory module may include any system, device or apparatus configured to retain program instructions and/or data for a period of time (e.g., computer-readable media).

Anti-malware module 104 may be communicatively coupled to various portions of electronic device 102 to scan or monitor the portions for malware. For example, anti-malware module 104 may be configured to access portions of electronic device 102 to determine the statuses of files 122. Although files 122 are illustrated, anti-malware module 104 may be configured to evaluate files 122 through access of, for example, the files themselves, operating system registries, access or permission tables, file drivers, or operating system kernels.

Files 122 may include any portion of data of electronic device 102, including files of any suitable type or kind, portions of file, memory locations within persistent or transitory memory, or operating system kernel objects. Files 122 may be reserved, controlled, or locked through any suitable scheme or mechanism. For example, a process such as kernel-mode process A 110 or kernel-mode process B 112 may lock, reserve, allocate, or otherwise control the permission to access one of files 122. Although kernel-mode process A 110 and kernel-mode process B 112 are illustrated in FIG. 1, any suitable process, application, script, executable, or other entity may attempt to lock, reserve, allocate, or otherwise control the permission to access on of files 122. In one embodiment, the process may attempt to control access permissions of one of files 122 by creating an operating system handle for the file, wherein access is reserved to the process creating the handle. In another embodiment the process may attempt to control access permissions of one of files 122 by changing read, write, or execute permission attributes for the file. Such permissions may exist, for example, on the memory page for the file as it is loaded in memory or for a portion of disk for the file as it resides in memory. In yet another embodiment, the process may attempt to control access permission of one of files 122 through filter drivers such as file filter drivers. In such an embodiment, access to a file may be controlled through operating system file services provided to processes using the operating system, and the file may be locked by adjusting filters within the operating system file services.

Anti-malware module 104 may be configured to determine, at or during boot time of electronic device 102, whether any files 122 are locked, reserved, or otherwise controlled. Anti-malware module 104 may be configured to make such determinations through any suitable method or mechanism. For example, anti-malware module 104 may determine, from operating system structures, all operating handles issued to processes, which may designate that a given file is being actively accessed by a given process. In another example, anti-malware module 104 may examine file permissions resident with a file or set in memory. Anti-malware module 104 may determine the processes responsible for locking, reserving, or changing permissions of files 122.

Further, anti-malware module 104 may be configured to determine that any such processes or other entities locking, reserving, or changing permissions of files 122 during boot time may be suspicious. Some such locking may be the result of trusted processes, such as the operating system kernel. However, such locking from unknown entities may be an indication of malware. Thus, anti-malware module 104 may be configured to evaluate the malware status of entities that it has determined have effected locking of files 122 during boot time. In addition, anti-malware module 104 may be configured to evaluate the malware status of the locked files 122 themselves. Furthermore, anti-malware module 104 may be configured to evaluate the malware status of other files accessed by the same entity.

Anti-malware module 104 may be configured to take any suitable steps to make such an evaluation. For example, anti-malware module 104 may be configured to perform such evaluations by, for example, accessing anti-malware rules 132 or anti-malware server 130. Anti-malware module 104 may determine an identifier of the responsible files or entities accessing the files, such as name, size, bit samples, hash, or digital signature. Anti-malware module 104 may use the determined identifier when accessing anti-malware rules 132 or anti-malware server 130.

Anti-malware rules 132 may include databases, signatures, libraries, behavioral rules, heuristic rules, whitelists—containing information about data, software, or websites known to be safe, blacklists—containing information about data, software, or websites known to be associated with malware, or any other information regarding identification of malware. Anti-malware module 104 may be configured to compare information about locked files 122 and the entities accessing them against anti-malware rules 132 to determine whether the received information is malicious or otherwise associated with malware; known to be safe; or unknown as to malware status. Anti-malware rules 132 may be stored locally to anti-malware module 104, such as within electronic device 102 or on storage accessible to electronic device 102. Anti-malware module 104 or another suitable entity may be configured to periodically update the contents of anti-malware rules 132 from an anti-malware server. Anti-malware rules 132 may be implemented in any suitable manner, such as with a file, record, data structure, library, application, script, or database.

Given the localized implementation of anti-malware rules 132, the contents and information contained therein may not be completely accurate. In addition, anti-malware rules 132 may have no information regarding "zero-day" attacks of malware, wherein a particular instance of malware is encountered for a first time. Further, anti-malware rules 132 may not have access to various information sources, such as field reports from various anti-malware clients or anti-malware laboratory results. An instance of a never-before-encountered, or only-recently-encountered entity accessing file permissions during boot may be suspicious and thus treated as malware until its operation can be verified. Accordingly, anti-malware module 104 may be configured to access anti-malware server 130 through network 128 to determine the latest anti-malware information. Furthermore, anti-malware module 104 may be configured to access anti-malware server 130 on demand after encountering an entity attempting to lock files 122, wherein the entity's malware status is unknown.

Anti-malware server 130 may be implemented through any suitable combination of hardware and software, and may be executing and operating as a cloud computer service or software-as-a-service on network 128. Network 128 may include, for example, the Internet, an intranet, wide-area-networks, back-haul-networks, peer-to-peer-networks, or any combination thereof.

For a given process or file, anti-malware server 130 or anti-malware rules 132 may be configured to determine whether the process or file is known to be associated with malware, known to be safe, or is unknown as to malware status. In one embodiment, anti-malware server 130 or anti-malware rules 132 may be configured to provide analysis for the entity in which it is not definitively known whether or not the entity is associated with malware. If it is definitively known whether, for example, a hash of the entity is matched to malware, then anti-malware module 104 may determine that the entity is malicious and take appropriate corrective action. Furthermore, if it is definitively known whether, for example, a hash of the entity is matched to a known safe program, such as a portion of the operating system kernel, then anti-malware module 104 may determine that the entity is safe and allow the locking operation. However, it may not be definitively known whether or not the entity locking the file is associated with malware based on a hash or signature of the entity. For example, the entity may have a hash or signature not previously encountered or fully analyzed. In another example, analysis of the hash, signature, or network address of the entity may not have yet yielded a determination definitively concluding that the entity is malicious or safe. Thus, anti-malware server 130 or anti-malware rules 132 may be configured to track reports, instances, and associated information for various software and network addresses to determine the likelihood that the software or network address is malicious. The likelihood may be based on any suitable criteria, such as distribution of reported instances, source of attempted transmissions, statuses of certificates, or other indications of suspicious activity. Taken individually, these indications of suspicious activity might not definitely prove the malware status of a given entity. However, anti-malware server 130 or anti-malware rules 132 may use them as factors in providing an estimation of the likelihood that the entity is malicious. Furthermore, the indication of suspicious activity may be changing in real time, as, for example, software is reported from various clients, or a network server is compromised, causing it to participate in a malware attack. Anti-malware server 130 or anti-malware rules 132 may be configured to provide a quantification of the likelihood that data 112 is malicious to anti-malware module 104.

In one embodiment, anti-malware module 104 may evaluate whether a given process, file, or other entity that has locked or attempted to lock a file is malicious by accessing anti-malware server 130 or anti-malware rules 132. In another embodiment, anti-malware module 104 may determine that such a process, file, or other entity is malicious by the very fact that the entity is locking or attempting to lock a file during boot. In such an embodiment, anti-malware module 104 may make exceptions to such a determination if the process, file, or other entity is known to be safe as dictated by anti-malware server 130 or anti-malware rules 132. For example, the entity causing the lock may appear on a whitelist in anti-malware rules 132. In yet another embodiment, anti-malware 104 may determine that such a process, file, or other entity is malicious if its malware status is otherwise unknown and has locked or attempted to lock a file during boot. In still yet another embodiment, anti-malware 104 may determine that such a process, file, or other entity's locking or attempting to lock a file is a behavioral factor which may be combined with other data to establish a malware rating. Such a rating may be expressed as a degree of confidence in a quantitative or qualitative measure.

The determination of whether or not a process, file, or other entity is malicious may consider the timing of when the entity is attempting to lock or has locked a file. In one embodiment, such locking during boot of electronic device 102 may be considered in determining malware status while any such locking after boot of electronic device 102 may be discarded, for the purposes of the present embodiment. After boot, many files may be locked through normal operation of electronic device 102. The presumption that such locking operations are suspicious or by default malicious may lead to many false-positives, wherein such operations are actually innocuous. Consequently, the malware detection techniques discussed herein might only rely upon whether the file is locked during boot, without consideration of whether the file is locked after boot.

Boot of electronic device 102 may operate in any suitable manner according to the particular configuration and operation of electronic device 102. For example, boot of electronic device 102 may include the period from power-on until the loading of an operating system is complete. In another example, boot of electronic device 102 may include the period from power-on until electronic device 102 is able to run user mode processes. Boot of electronic device 102 may also describe the boot of an individual operating system, among multiple such operating systems, guest operating systems, or virtual machines on electronic device 102.

Thus, anti-malware module 104 may be configured to be launched from, for example, a boot loader, a hypervisor, a secure software layer running at a higher priority than all other software on electronic device 102, a secure software layer running at ring "−1" priority, a trusted memory services layer, or other suitable mechanism.

Anti-malware module 104 may be configured to take any suitable corrective action for file, process, or other entity associated with a locking or attempted lock of a file during boot. For example, anti-malware module 104 may block, remove, clean, or quarantine such an entity. In another example, if the malware status of the entity is not otherwise known, the entity may be placed in a sandbox to observe its operation or reported to anti-malware server 130.

In operation, anti-malware module 104 may be executing on an electronic device such as electronic device 102 or on another electronic device configured to access electronic device 102. Anti-malware module 104 may be launched by a suitable portion of an electronic device, such as by a boot-loader of electronic device 102 operating system, a hypervisor, or another secure platform. Anti-malware module 104 may scan or monitor one or more files 122, or indicators of such files 122, to determine whether or not any of files 122 have been locked, reserved, or otherwise had access permissions altered during boot.

For example, file3.txt 118 and file2.txt 116 may be resident on electronic device 102. During boot, anti-malware module 104 may determine the lock status of each such file. Anti-malware module 104 may determine that file2.txt 116 is not reserved, locked, or otherwise had access permissions altered, but that file3.txt 118 has been reserved for access by use of a file handle 124. Anti-malware module 104 may trace the operation of the locking method or mechanism—in this case, assignments of file handles to processes—to determine that the file has been reserved by kernel-mode process A 110. Anti-malware module 104 may determine what other files are associated with kernel-mode process A 110, such as file1.txt 114. Such a file may have spawned kernel-mode process A 110, contain data for kernel-mode process A 110, or have any other relationship with kernel-mode process A 110. Anti-malware module 104 may determine that one or more of file3.txt 118, file1.txt 114, and kernel-mode process A 110 are suspicious because of their association with a locking operation during boot.

In one embodiment, anti-malware module 104 may treat file3.txt 118, file1.txt 114, and kernel-mode process A 110 as malware by default and take appropriate corrective action. In another embodiment, anti-malware module 104 may determine whether file3.txt 118, file1.txt 114, or kernel-mode process A 110 are known to be safe according to anti-malware rules 122 or anti-malware server 130. In such an embodiment, anti-malware module 104 may allow the operation of these to continue if it is determined that they are known to be safe and free from malware. In a further embodiment, if one or more of file3.txt 118, file1.txt 114, and kernel-mode process A 110 are not affirmatively know to be safe, anti-malware module 104 may treat such entities as malware by default and take appropriate corrective action. In another further embodiment, if one or more of file3.txt 118, file1.txt 114, and kernel-mode process A 110 are determined to have an unknown malware status, anti-malware module 104 may send information about the entity to anti-malware server 130 for further analysis. In various embodiments, the corrective action taken or lack thereof may be stored and reported to anti-malware server 130.

During a subsequent scan or monitoring of electronic device 102 after booting has completed, anti-malware module 104 may determine that file4.txt 120 has been locked for use by kernel-mode process B 112 through the mechanism of a file handle 126. However, because boot has been completed, anti-malware module 104 might not use such information to determine whether by kernel-mode process B 112, file4.txt 120, or associated file2.txt 116 are associated malware.

Although locking, reservation, allocation, or other access permissions are illustrated in FIG. 1 as determined by the presence of a file handle, any other suitable method or mechanism may be used. For example, anti-malware module 104 may examine the access permissions for files 122 as each resides on disk or in memory. Such permissions may include, for example, allow/deny read, allow/deny write, or allow/deny execute. If any of such access permissions is changed during boot, varies from a known value, anti-malware module 104 may determine that a locking operation or attempted locking operation has been made. In another example, anti-malware module 104 may determine whether any disk, file, or memory access filters on kernel mode drivers have denied attempted access to one of files 122. If any of such denials have occurred during boot, anti-malware module 104 may determine that a locking operation or attempted locking operation has been made.

Figure 2:
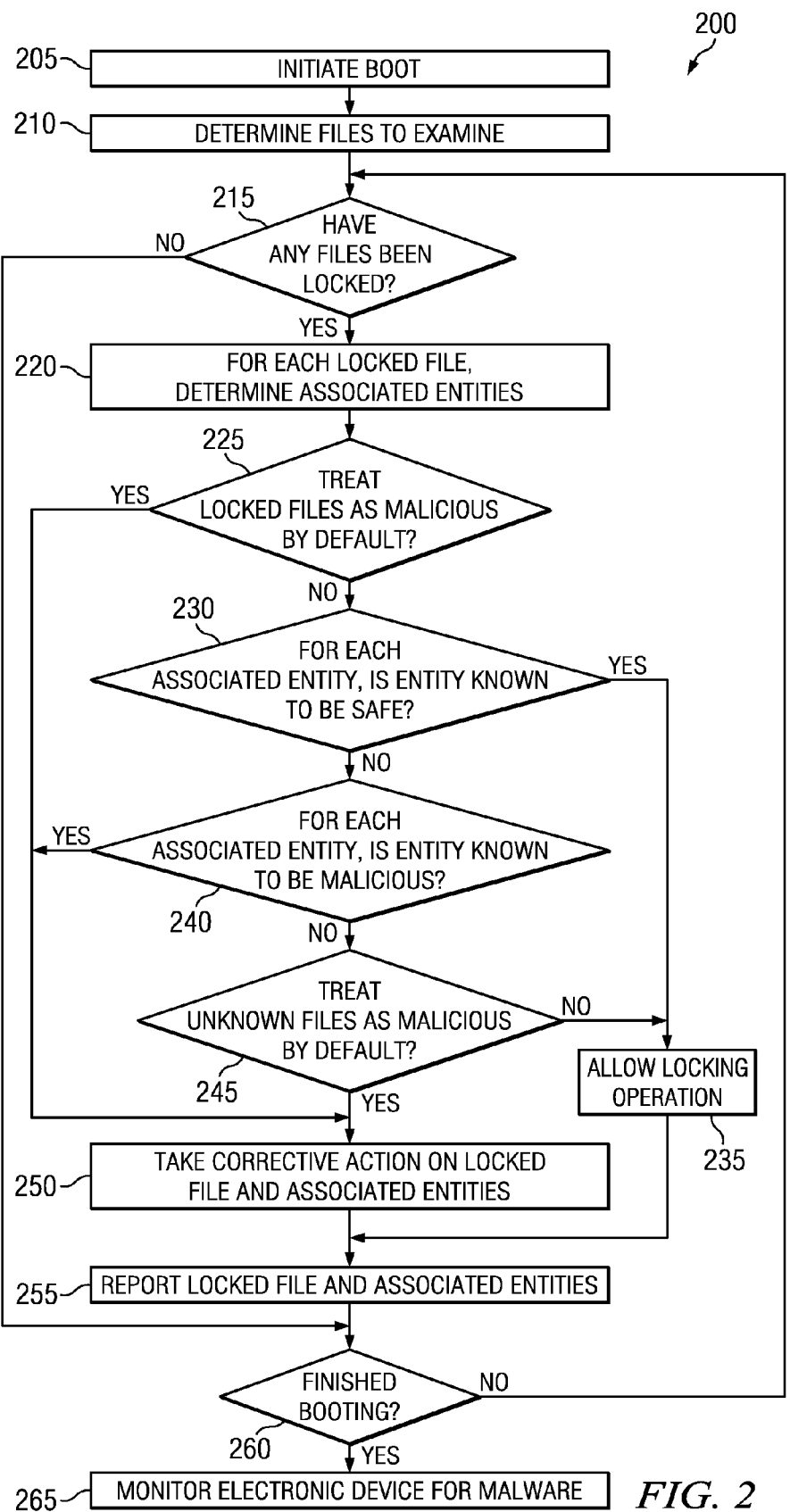
FIG. 2 is an illustration of an example embodiment of a method for identifying malware, including rootkits, based on access permissions.

FIG. 2 is an illustration of an example embodiment of a method 200 for identifying malware, including rootkits, based on access permissions. In step 205, a boot sequence of an electronic device, operating system, or other entity may be initiated. In step 210, a number of files, memory locations, or other portions of the electronic device that are to be monitored may be determined. Such files may be monitored for the duration of the boot sequence.

In step 215, it may be determined whether any files have been locked, reserved, allocated, had access permissions changed, or experienced any other status change or operation to cause exclusive use or access of the file. Any suitable method or mechanism may be used to determine whether a given file is locked, such as examining file handle assignment, changes to permissions in a permission table, changes in permissions for files as loaded into memory or resident on disk, or driver filter operations. Step 215 and subsequent steps 220-255 may be repeated until booting has completed. Thus, if is has been determined that a file has been so locked, method 200 may proceed to step 220. If it has been determined that no file has been so locked, method 200 may proceed to step 260.

In step 220, for each such locked file, associated entities may be determined. Such entities may include, for example, scripts, drivers, processes, or applications that caused the locking operation, as well as additional files, processes, applications, or other modules associated with such an entity.

In step 225, it may be determined whether to treat all locked files as malicious by default. If so, method 200 may proceed to step 250. If not, method 200 may proceed to step 230. Steps 230-245 may be repeated for each associated entity determined from step 220. Such steps may be repeated in sequence, in parallel, or in any other suitable manner.

In step 230, for each associated entity determined from step 220, or a subset thereof not already analyzed, it may be determined whether or not the entity is known to be safe. Such a determination may be made by, for example, accessing anti-malware rules, databases, whitelists, or servers. If the entity is known to be safe, then method 200 may proceed to step 235. If the entity is not known to be safe, then method 200 may proceed to step 240.

In step 235, the locking operation may be allowed. Method 200 may then proceed to step 255.

In step 240, for each associated entity determined from step 220 or a subset thereof not already analyzed, it may be determined whether the entity is known to be malicious. Such a determination may be made by, for example, accessing anti-malware rules, databases, whitelists, or servers. If the entity is determined to be malicious, then method 200 may proceed to step 250. If not, method 200 may proceed to step 245

In step 245, it may have been determined that the entity is neither known to be malicious nor known to be safe. The entity may have a malware status of "unknown." Such an unknown status may be accompanied by a quantitative or qualitative rating tending to indicate that the entity is malicious or note. In step 245, it may be then determined whether to treat such an unknown entity as malicious. If so, method 200 may proceed to step 250. If not, in one embodiment method 200 may proceed to step 235. In another embodiment, additional analysis or thresholds may be applied, such as evaluating a qualitative or quantitative rating of the malware likelihood of the entity. If the entity's rating exceeds or falls below a given threshold indicating a tendency to be malware, then method 200 may proceed to step 250. If the entity's rating exceeds or falls below a given threshold indicating a tenancy to be safe, then method 200 may proceed to step 235. Furthermore, the locking operation may be evaluated in combination with other factors such as heuristic rules to evaluate whether to direct handling of the entity to steps 250 or 235, depending upon the likelihood of the entity to be malware. In yet another embodiment, the entity may be quarantined or placed in a sandbox for further evaluation.

In step 250, the entity may be handled as if it associated with malware and any suitable corrective action may be taken, such as cleaning, removing, quarantine, or otherwise neutralizing the entity. In one embodiment, such corrective action may be applied to all associated entities. In another embodiment, the determination that an entity is associated with a locked file may be used as a heuristic or factor in a larger analysis of the malicious nature of the entity.

In step 255, the locked file and the associated entities may be reported to, for example, an anti-malware server. Information regarding the identity of each such entity, the mechanism of locking, and other suitable information may be reported.

In step 260, it may be determined whether booting has completed. If it has not, method 200 may proceed to step 215. If booting has completed, method 200 may proceed to step 265.

In step 265, the electronic device may be monitored for malware. Such monitoring, if evaluating the lock status of any part of the electronic device, might not use the logic or findings from steps 215-255 in evaluating whether such a status indicates malware.

Method 200 may be implemented using the system of FIG. 1 or any other system operable to implement method 200. As such, the preferred initialization point for method 200 and the order of the steps comprising method 200 may depend on the implementation chosen. In some embodiments, some steps may be optionally omitted, repeated, or combined. In certain embodiments, method 200 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; non-transitory media; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for monitoring for malware, comprising:
   during a boot process on an electronic device, determining a portion of memory with a processor;
   during the boot process, determining that the portion of memory is reserved for exclusive access by an entity on the electronic device with the processor; and
   based at least on the determination that a portion of memory is reserved for exclusive access during the boot process, determining that the reservation is indicative of malware with the processor;
   wherein determining that the reservation is indicative of malware is made independent of determinations, made after the boot process has completed, that the portion of memory is reserved for exclusive access by the entity on the electronic device.

2. The method of claim 1, wherein the portion of memory comprises a file on the electronic device.

3. The method of claim 1, wherein determining that a portion of a memory is reserved for exclusive access during the boot process comprises determining whether a handle has been issued for the portion of memory.

4. The method of claim 1, wherein determining that a portion of a memory is reserved for exclusive access during the boot process comprises determining whether a file access permission has been set for the portion of memory.

5. The method of claim 1, wherein the reservation is determined to be indicative of malware based on:
   the determination that the portion of memory is reserved for exclusive access by an entity on the electronic device during the boot process;
   a default policy to handle all reservations for exclusive access during the boot process as malicious.

6. The method of claim 1, wherein determining that the reservation is indicative of malware further comprises:
   using information independent of the reservation, determining that the malware status of the entity is unknown; and
   based at least on the unknown malware status of the entity and on the determination that the portion of memory is reserved for exclusive access during the boot process, determining that the reservation is indicative of malware.

7. The method of claim 1, wherein determining that the reservation is indicative of malware further comprises:
   using information independent of the reservation, determining that the malware status of the entity is unknown; and
   determining that the reservation is indicative of malware based at least on the unknown malware status of the entity, the determination that the portion of memory is reserved for exclusive access during the boot process, and a default policy to handle all reservations by unknown entities during the boot process as malicious.

8. The method of claim 1, wherein determining that the reservation is indicative of malware further comprises:
   using information independent of the reservation, determining that the malware status of the entity is unknown; and
   based at least on the unknown malware status of the entity, determining that the reservation is indicative of malware.

9. An article of manufacture, comprising:
   one or more non-transitory computer readable medium comprising computer-executable instructions carried on the computer readable medium, the instructions readable by a processor, the instructions, when read and executed, for causing the processor to:
   during a boot process on an electronic device, determine a portion of memory;
   during the boot process, determine that the portion of memory is reserved for exclusive access by an entity on the electronic device; and
   based at least on the determination that a portion of memory is reserved for exclusive access during the boot process, determine that the reservation is indicative of malware;
   wherein causing the processor to determine that the reservation is indicative of malware is made independent of determinations, made after the boot process has completed, that the portion of memory is reserved for exclusive access by the entity on the electronic device.

10. The article of claim 9, wherein the portion of memory comprises a file on the electronic device.

11. The article of claim 9, wherein causing the processor to determine that a portion of a memory is reserved for exclusive access during the boot process comprises causing the processor to determine whether a handle has been issued for the portion of memory.

12. The article of claim 9, wherein causing the processor to determine that a portion of a memory is reserved for exclusive access during the boot process comprises causing the processor to determine whether a file access permission has been set for the portion of memory.

13. The article of claim 9, wherein causing the processor to determine that the reservation is indicative of malware further comprises causing the processor to:
   using information independent of the reservation, determine that the malware status of the entity is unknown; and
   based at least on the unknown malware status of the entity, determine that the reservation is indicative of malware.

14. A system for monitoring for malware, comprising:
   an electronic device including a portion of memory;
   a processor coupled to one or more computer readable medium, the computer-executable instructions carried on the computer readable medium, the instructions readable by the processor, the instructions, when read and executed, for causing the processor to:

during a boot process on the electronic device, determine the portion of memory;

during the boot process, determine that the portion of memory is reserved for exclusive access by an entity on the electronic device; and based at least on the determination that a portion of memory is reserved for exclusive access during the boot process, determine that the reservation is indicative of malware;

wherein causing the processor to determine that the reservation is indicative of malware is made independent of determinations, made after the boot process has completed, that the portion of memory is reserved for exclusive access by the entity on the electronic device.

15. The system of claim 14, wherein the portion of memory comprises a file on the electronic device.

16. The system of claim 14, wherein causing the processor to determine that a portion of a memory is reserved for exclusive access during the boot process comprises causing the processor to determine whether a handle has been issued for the portion of memory.

17. The system of claim 14, wherein causing the processor to determine that a portion of a memory is reserved for exclusive access during the boot process comprises causing the processor to determine whether a file access permission has been set for the portion of memory.

* * * * *